United States Patent [19]

Janow

[11] Patent Number: 5,394,198
[45] Date of Patent: Feb. 28, 1995

[54] LARGE-SCREEN DISPLAY SYSTEM

[75] Inventor: Richard H. Janow, South Orange, N.J.

[73] Assignee: AT&T Corp., Murray Hill, N.J.

[21] Appl. No.: 995,425

[22] Filed: Dec. 22, 1992

[51] Int. Cl.[6] .............................................. H04N 7/14
[52] U.S. Cl. .................................... 348/744; 348/783; 348/15; 359/727; 359/460; 359/453
[58] Field of Search .................... 358/85, 93, 88, 230, 358/231, 232, 233, 234, 236, 225; 379/53, 54; H04N 7/14; 359/443, 449, 451, 453, 460, 479, 208, 209, 727, 728; 348/14, 15, 744, 776, 783

[56] References Cited

U.S. PATENT DOCUMENTS

| | | | |
|---|---|---|---|
| 4,167,311 | 9/1979 | Pund | 359/451 |
| 4,355,329 | 10/1982 | Yoshida et al. | 358/85 |
| 4,400,725 | 8/1983 | Tanigaki | 358/85 |
| 4,890,314 | 12/1989 | Judd et al. | 358/231 |
| 5,111,498 | 5/1992 | Guichard et al. | 358/85 |
| 5,117,285 | 5/1992 | Nelson et al. | 358/85 |
| 5,157,503 | 10/1992 | Dugdale | 358/231 |
| 5,162,897 | 11/1992 | Jitsukata et al. | 358/88 |

FOREIGN PATENT DOCUMENTS

| | | | |
|---|---|---|---|
| 228893 | 9/1990 | Japan | H04N 7/14 |
| 9686 | 1/1991 | Japan | H04N 7/14 |

*Primary Examiner*—James J. Groody
*Assistant Examiner*—Glenton B. Burgess
*Attorney, Agent, or Firm*—Eugene J. Rosenthal

[57] ABSTRACT

A folded, magnifying, front projection arrangement for video displays includes a video image source, such as a flat panel display unit out of the user's field of view, projects its image onto a concave mirror also out of the user's field of view. The video image source is maintained off-axis with respect to the optic axis of the concave mirror and at a distance from the concave mirror between one and two times the distance from the concave mirror to its principal focal surface, which would be the principal focal plane if the concave mirror were a spherical or a parabolic mirror. The concave mirror, in turn, reflects and focuses the light from the video image source onto a projection screen, within the user's field of view, resulting in a magnified image. The distortion of the projected image that would otherwise result from off-axis projection is compensated for by maintaining the plane of the video image source at a non-perpendicular angle to the optic axis of the mirror. As a result, the image formed on the projection screen is undistorted and in focus across its full width and breadth. Since the projection screen is not an active element, a small aperture, or hole, can easily be cut through it so that a video camera, for capturing the image of the viewer of the screen, may be positioned behind it. The image resulting from such camera placement provides good eye contact to a remote party viewing the image.

22 Claims, 8 Drawing Sheets

LARGE-SCREEN DISPLAY SYSTEM

TECHNICAL FIELD

This invention relates to video displays, and more particularly, to a large screen display system suitable for workstations and video telephony.

BACKGROUND OF THE INVENTION

Today, large video displays are very expensive. This is because the achievable size for both cathode ray tubes (CRT) and single panel liquid crystal displays (LCDs) is limited. Also, within the achievable limits, the greater the size of the CRT or LCD panel, the greater the cost. Furthermore, while several CRTs or LCD panels may be combined into a single, larger display, the cost of using multiple such display devices, combined with the cost for the control system that coordinates what is displayed on each, is prohibitive for most applications. Another alternative, conventional video projection systems, are bulky and are costly because of their complexity.

When used for video telephony, the aforementioned large video display systems do not permit good eye contact between the parties on the video telephone call. This is because of the difficulty in placing the camera in a position so that good eye contact is achieved while each party is looking at the image of the other party or parties that is being displayed.

A further difficulty with prior display devices is that they are not suitable for use in displaying separate, full color, left and right images for use in creating 3-dimensional images.

SUMMARY OF THE INVENTION

In accordance with the principles of the invention, the aforementioned difficulties with video displays are mitigated by employing a folded, magnifying, front projection arrangement. A video image source, such as a substantially flat panel display unit, e.g. a backlit color LCD panel or CRT, out of the user's field of view, projects its image onto a concave mirror. e.g., a spherical or parabolic mirror, also out of the user's field of view. The video image source is maintained off-axis with respect to the optic axis of the concave mirror and at a distance from the concave mirror between one and two times the distance from the concave mirror to its principal focal surface, which would be the principal focal plane if the concave mirror were a spherical or a parabolic mirror. In other words, the video image source is located off of the optic axis and within the volume defined by the optic axis, the principal focal surface and a corresponding surface intersecting a point on the optic axis that is twice the focal distance from the concave mirror. The concave mirror, in turn, reflects and focuses the light from the video image source onto a projection screen, within the user's field of view, resulting in a magnified image.

The distortion of the projected image that would otherwise result from off-axis projection if the video image source plane and the mirror's optic axis were orthogonal is compensated, in accordance with an aspect of the invention, by maintaining the plane of the video image source at a non-perpendicular angle to the optic axis of the mirror. As a result, the image formed on the projection screen is undistorted and in focus across its full width and breadth.

Since the projection screen is not an active element, a small aperture, or hole, can easily be cut through it so that a video camera, for capturing the image of the viewer of the screen, may be positioned behind it. Advantageously, the image resulting from such camera placement provides good eye contact to a remote party viewing the image. In one embodiment of the invention, the projection system, camera and all necessary electronics are integrated into a unit which may be attached to a desk or wall.

In another embodiment of the invention, an additional video image source and concave mirror are arranged so that the image from the additional video image source is also projected onto the projection screen. Interposed between each of the video image sources and its respective one of the concave mirrors is a polarizer. Each of the polarizers polarizes the light passing through it, with the direction of polarization of each of the polarizers being substantially orthogonal to the polarization direction of the other. If the images displayed on each video image source are left and right stereoscopic images, and the screen is viewed while wearing a pair of glasses in which each lens only passes the polarized light for one of the projected images, the viewer will see a full color stereoscopic, i.e., 3-dimensional, image.

DETAILED DESCRIPTION

Figure 1:
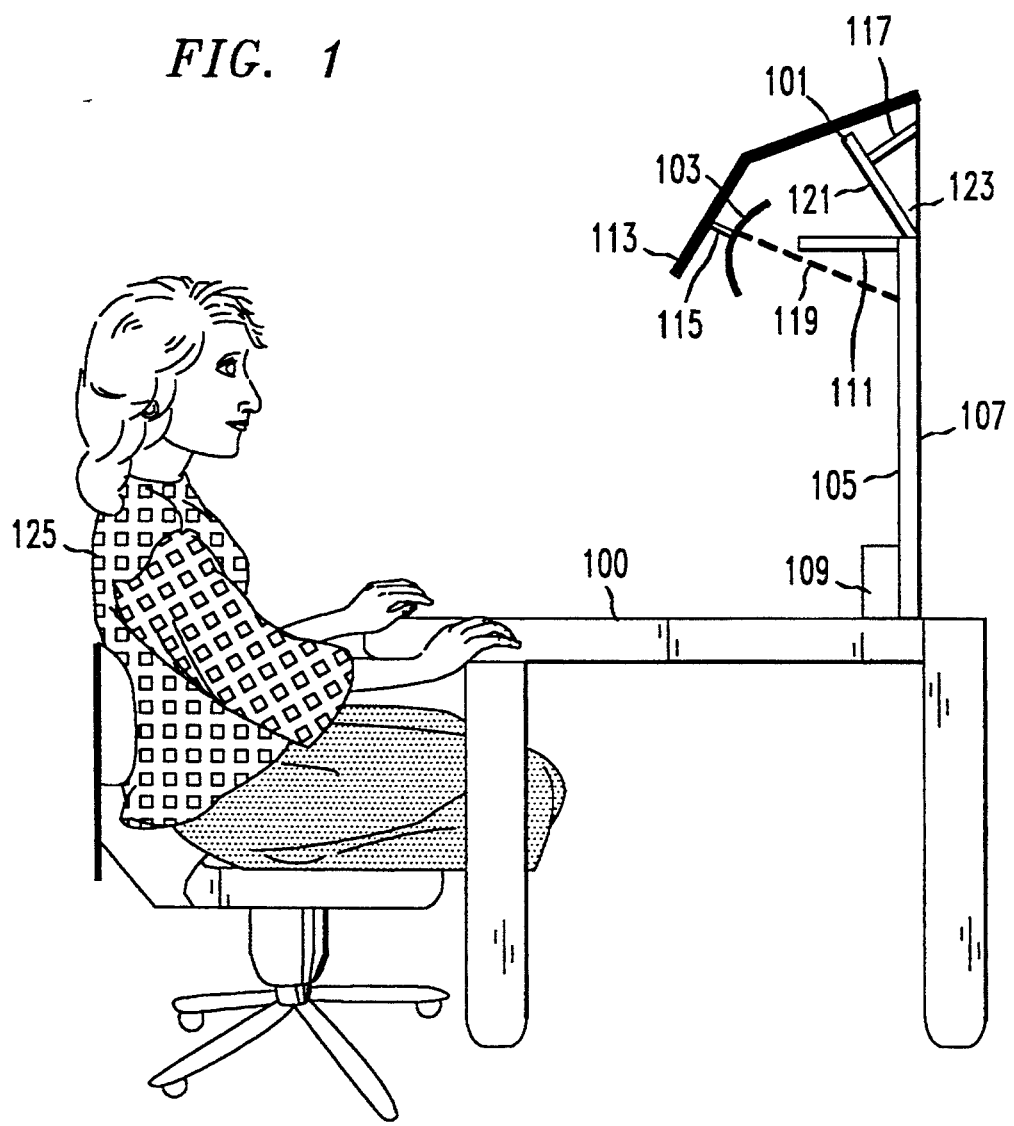
FIG. 1 shows a side view of an embodiment of a front projection video system arranged according to the principles of the invention and mounted at the rear of a desk for use by a person sitting at the front of the desk.

FIG. 1 shows a side view of an embodiment of a large screen display system arranged according to the principles of the invention. The system is a front projection system that can be mounted at the rear of desk 100 for use as part of a workstation by person 125 sitting at the front of desk 100. The front projection video system includes a) video image source 101, b) concave mirror 103, c) projection screen 105, d) supportive frame 107, e) base 109, f) light baffle 111, g) shroud 113 and h) supports 115 and 117.

Video image source 101 is a substantially flat panel display unit. Preferably the flat panel display unit contains a backlit color LCD panel of the active matrix type, e.g., one that allows the transmission of light through it. It is noted that to assure uniform distribution of light through the LCD panel the flat panel display unit may have a diffuser or condenser located between its light source and the LCD panel. Such flat panel display units are commercially available. A CRT, such as in a computer monitor or television may also be used. Video image source 101 is connected to supportive frame 107 by support 117.

Mounted to shroud 113 is support 115 to which, in turn, is mounted concave mirror 103. Preferably, concave mirror 103 is either a parabolic or spherical mirror. Shroud 113 is connected to one end of supportive frame 107 so as to conceal video image source 101, concave mirror 103, light baffle 111 and supports 115, 117 from the view of person 125. Base 109 is mounted at the end of supportive frame 107 opposite from shroud 113.

In accordance with the principles of the invention, video image source 101 and concave mirror 103 are arranged so that the image projected from video image source 101 is reflected by concave mirror 103 onto projection screen 105 affixed to the front surface of supportive frame 107. Projection screen 105 is a screen suitable for viewing images that are projected upon it, such as a movie screen. Such screens typically have a lenticular structure on their viewing surface. In accordance with an aspect of the invention, when the system is oriented as in FIG. 1, concave mirror 103 is mounted so that its optic axis 119 points downward, towards projection screen 105. Video image source 101 is located above optic axis 119 of concave mirror 103 so that the resulting image is formed below concave mirror 103 on projection screen 105. Also, in accordance with the principles of the invention, video image source 101 is mounted in a plane so that its top 121 is closer to the mirror 103 than its bottom 123. This is done so that the image will be undistorted and in focus across its full width and breadth, as discussed below.

Light baffle 111 is mounted substantially perpendicular to supportive frame 107 and it is located above optic axis 119 of concave mirror 103 and below bottom 123 of video image source 101.

Figure 2:
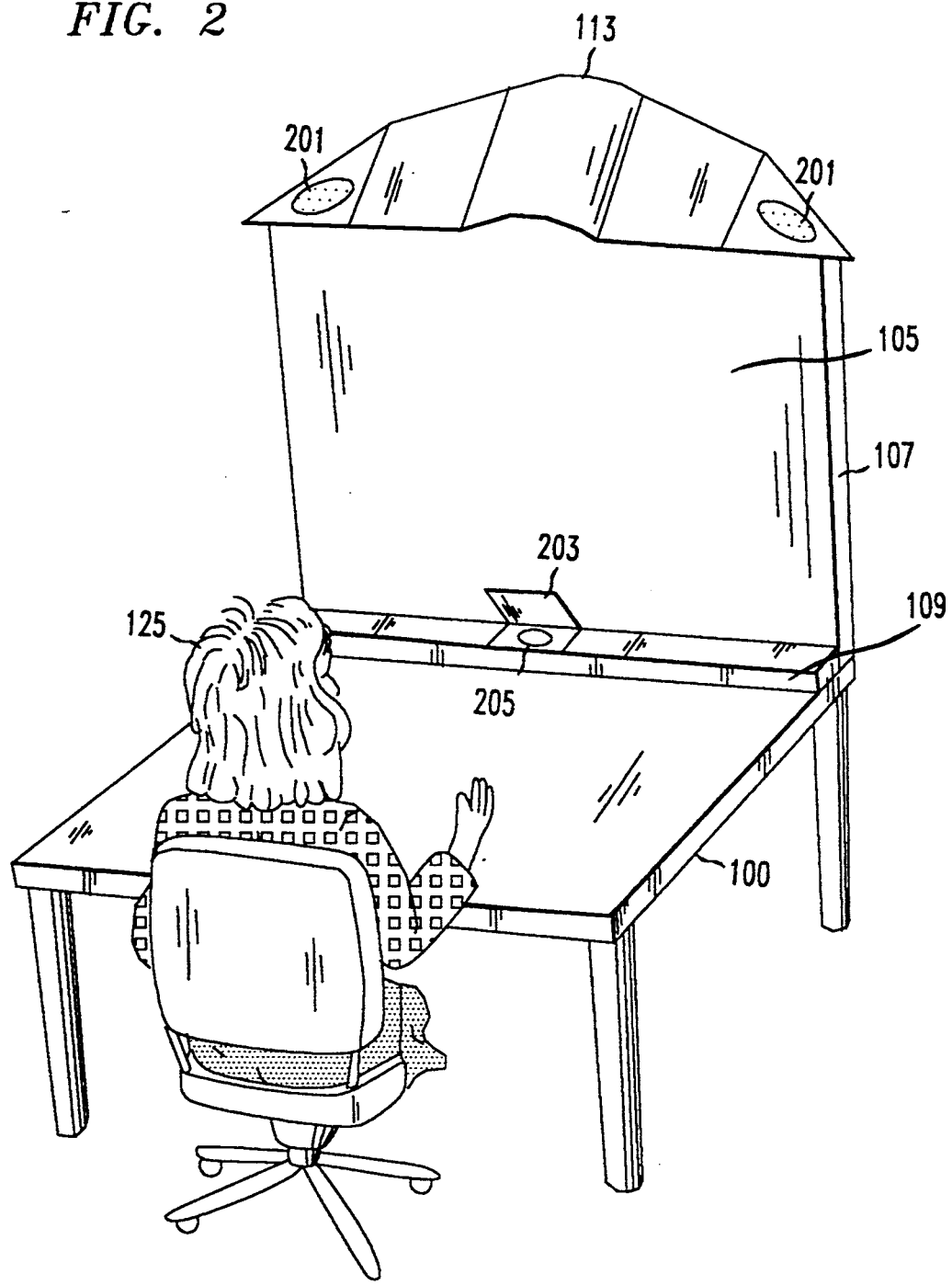
FIG. 2 shows another view of the embodiment of the invention shown in FIG. 1.

FIG. 2 shows another view of the embodiment of the invention shown in FIG. 1. In this view, desk 100, projection screen 105, supportive frame 107, base 109, and shroud 113 can be seen. In addition, shown mounted in shroud 113 are speakers 201, for conveying stereo sound associated with the image being projected on screen 105. Shroud 113 conceals from view a) video image source 101, b) concave mirror 103, c) light baffle 111 and d) supports 115, 117.

Flat mirror 203 is mounted on base 109 at an angle such that it affords an appropriate field of view of person 125 to the focal plane 205 of a video camera optics assembly mounted in base 109. Base 109 can optionally be used to contain the electronics for driving the video image source 101. It is noted that the images displayed by the front projection video system may include television and/or computer generated information. Accordingly, base 109 may also contain additional circuitry such as computer and/or television receiver/decoder circuitry for generating and displaying such images in addition to the circuitry necessary for driving the display and video camera.

Figure 3:
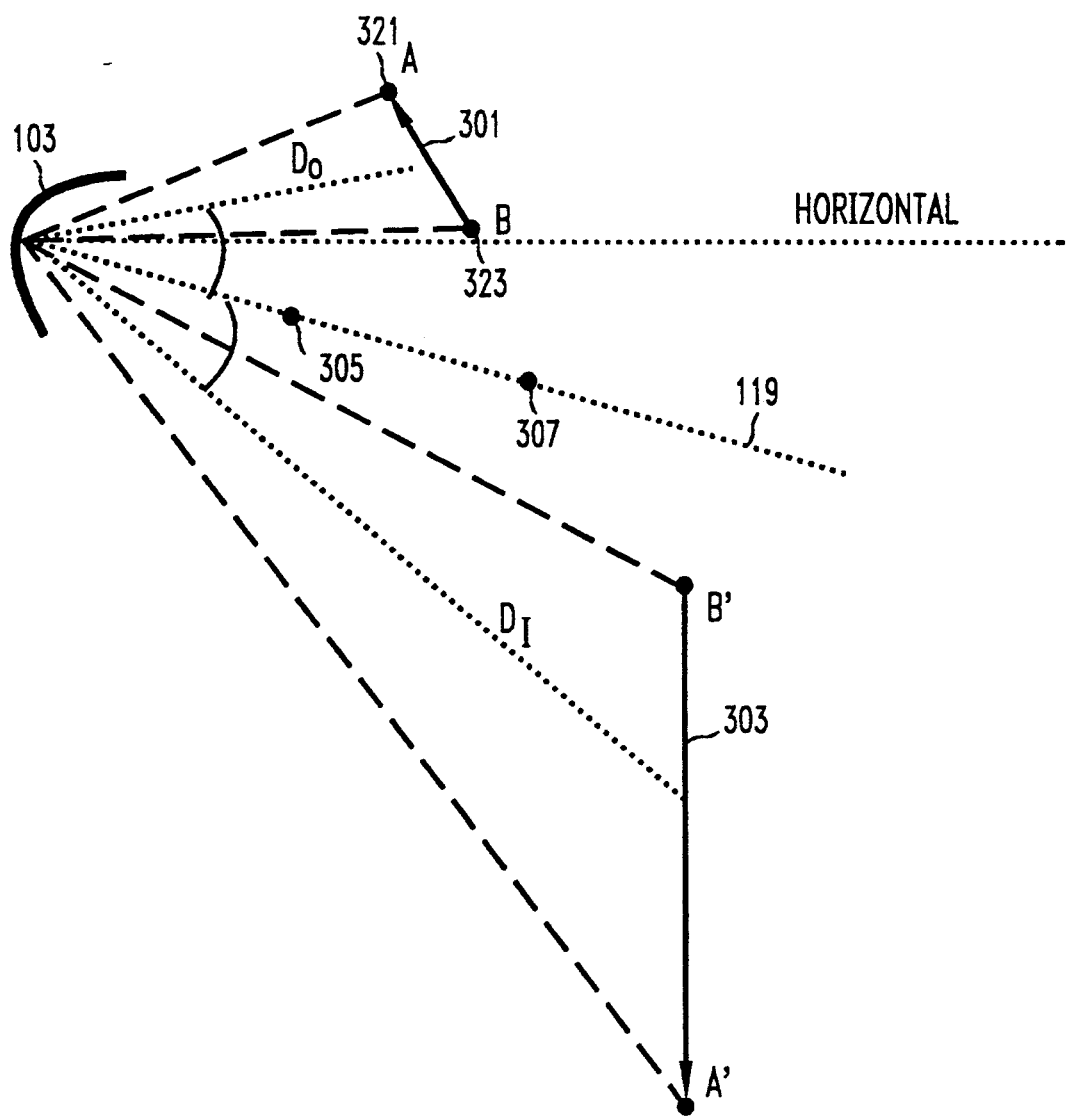
FIG. 3 shows a ray diagram demonstrating the principles of the invention.

FIG. 3 shows an optical ray diagram demonstrating the principles of the invention. For ease of explanation, concave mirror 103 is presumed to be either spherical or parabolic. Object 301 is in the plane of video image source 101 and image 303 is the image of object 301 as reflected by concave mirror 103 onto the plane of screen 105. Point 305 on optic axis 119 of mirror 103 is the principal focus of mirror 103, e.g., for a spherical or parabolic mirror point 305 is the focal point located at the focal distance. Point 307 on optic axis 119 of mirror 103 is a point along optic axis 119 at twice the distance from the mirror surface as is point 305.

Standard ray tracing techniques indicate that when object 301 is located further away from concave mirror 103 than point 305 and closer to concave mirror 103 than point 307, then the resulting image 303 will be a magnified, real image, further away from concave mirror 103 than point 307. Thus, in accordance with an aspect of the invention, object 301 must be maintained inverted with respect to the image that is desired to appear on screen 105. This can be achieved by rotating video image source 101 so that it is "upside-down" with respect to the typical orientation if its image were being viewed directly.

Because object 301 is above optic axis 119 of concave mirror 103, its image 303 is formed below optic axis 119. In accordance with an aspect of the invention, by appropriately adjusting the orientation of the plane of object 301, so that its top at point 321 is closer to concave mirror 303 than its bottom point 323, image 303 can be made to be in focus across the plane of projection screen 105 and to be free of distortion attributable to projection from above optic axis 119 of concave mirror 303.

Although, as described above, concave mirror 103 has a focal surface that is a plane, because it is either a spherical or parabolic mirror, those skilled in the art will readily recognize that embodiments of the invention using concave mirrors other than spherical or parabolic mirrors may result in focal surfaces that are not planes, because of the configuration of the mirror. Use of such concave mirrors may be desirable, depending on the nature of the surface of projection screen 105. For example, a gently curved projection screen may be desired. Thus, in its most general terms, video image source 101 is located off of optic axis 119 and within the volume defined by optic axis 119, the principal focal surface and a corresponding surface intersecting a point on the optic axis that is twice the focal distance from concave mirror 103.

Figure 4:
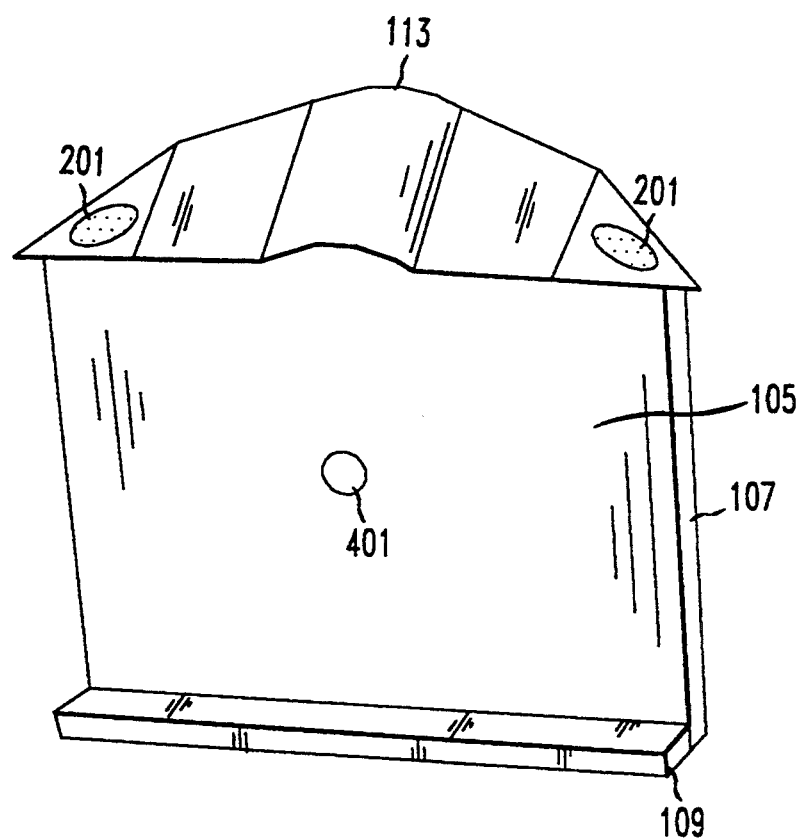
FIG. 4 shows a small hole cut in the projection screen of FIG. 1 so that a video camera optical assembly, for capturing the image of the viewer of the projection screen and his environment.

Since the projection screen is not an active element, a small aperture, or hole, can easily be cut through it and a video camera optical assembly, for capturing the image of the viewer of projection screen 105 and his environment, may be positioned behind the hole. FIG. 4 shows projection screen 105, supportive frame 107, base 109, shroud 113 and speakers 201 with hole 401, located approximately in the center of projection screen 105. Advantageously, the image resulting from such camera placement provides good eye contact to a remote party viewing the image. Furthermore, since hole 401 is small the image on projection screen 105 is only minimally impacted. It is noted that the hole need not be in the vertical or horizontal center of projection screen 105 but may be placed to have the most advantageous field of view and/or human factors, depending on the application for which the projection system is being used.

Figure 5:
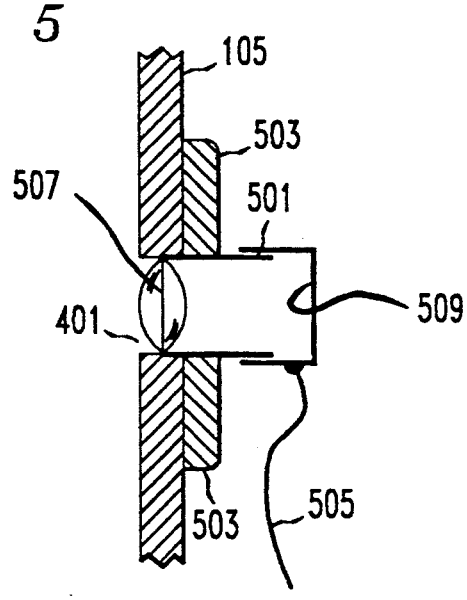
FIG. 5 shows a side view of a projection screen having the camera optics assembly positioned in the hole of FIG. 4.

FIG. 5 shows a side view of projection screen 105 having camera optics assembly 501 positioned in hole 401. Camera optics assembly 501 is supported against projection screen 105 by annular support 503. Advantageously, lens 507, the front camera lens element, may be fixedly positioned close to the plane of projection screen 105. To focus an image in camera focal plane 509, camera focal plane 509 is moved in relation to lens 507. Power, control and data communication path 505 is used to a) supply power for the operation of camera optics assembly 501, b) focus an image in camera focal plane 509 in response to signals from an autofocus system (not shown) and c) to carry away data representing objects in the field of view of camera optics assembly 501.

Figure 6:
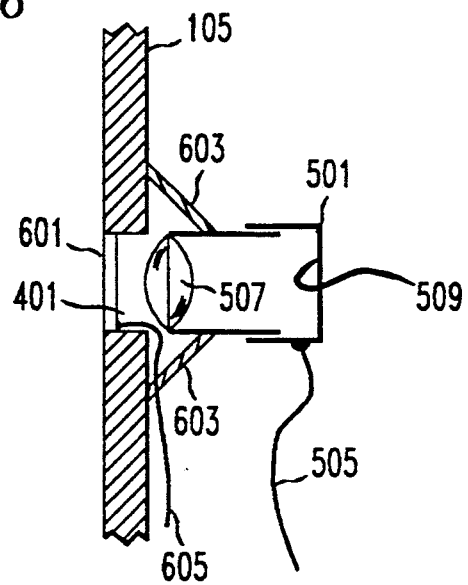
FIG. 6 shows a side view of an alternative embodiment of the projection screen having a light valve positioned in the hole of FIG. 4 and in front of the camera optics assembly.

FIG. 6 shows a side view of an alternative embodiment of projection screen 105 having light valve 601 positioned in hole 401 and in front of camera optics assembly 501. Camera optics assembly 501 is supported behind projection screen 105 by annular support 603. Advantageously, lens 507, the front camera lens element, may be positioned close to the plane of projection screen 105. To focus an image in camera focal plane 509, either lens 507 or camera focal plane 509 may be moved. Light valve 601 is alternately opened and closed in response to signals on line 605. In the open position, light passes through light valve 601 so that an image may be formed by camera optics assembly 501. In the closed position, light is blocked from reaching camera optics assembly 501 and the surface of light valve 601 on the side opposite from camera optics assembly 501 reflects light falling upon it from the front projection system. Advantageously, the projected image appears more uniform and the existence of hole 401 is less apparent to a viewer of the projected image. The opening and closing of light valve 601 may be coordinated with the refresh and display cycle of video image source 101 and the image capture cycle of camera optics assembly 501.

Figure 7:
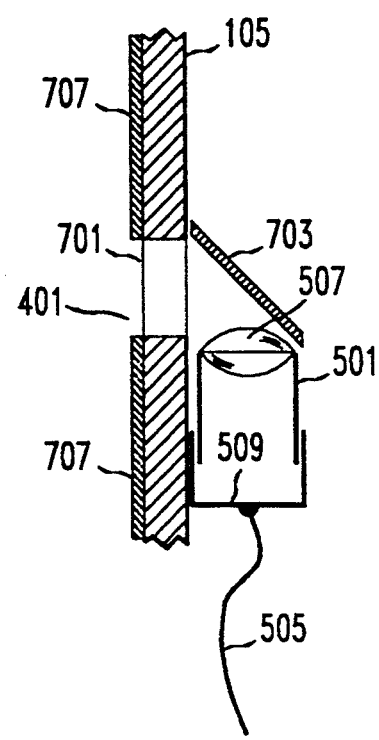
FIG. 7 shows a side view of a further alternative embodiment of the projection screen in which a transparent material is positioned in the hole of FIG. 4 and the camera optics assembly is mounted parallel to the projection screen.

FIG. 7 shows a side view of a further alternative embodiment of projection screen 105 in which transparent material 701 is positioned in hole 401. Also shown is another embodiment for positioning camera optics assembly 501. Transparent material 701 may be a plug inserted into hole 401 or it may be made by removing in the area of hole 401 the reflective coating which otherwise covers the surface of projection screen 105. In this embodiment, camera optics assembly 501 is positioned so that its optical axis is parallel to projection screen 105. Mirror 703, positioned at approximately a 45 degree angle relative to the plane of projection screen 105, directs the light coming through transparent material 701 into camera optics assembly 501. To focus an image in camera focal plane 509, either lens 507 or camera focal plane 509 may be moved.

It is noted that the positioning of camera optics assembly 501 is independent of the method of providing a transparent area for the passage of light through projection screen 105. It is also noted that the intensity of the projected image may be reduced in the area of hole 401. To compensate for such reduced intensity, the corresponding area of video image source 101 may be increased in brightness. For example, if video image source 101 is flat panel display unit containing an active matrix type backlit color LCD panel having a diffuser located between its light source and the LCD panel to assure uniform distribution of light through the LCD panel, the diffuser could be modified by increasing its transparency at a particular location so that additional light passes through that part of the LCD panel that corresponds to the area projected on hole 401.

Figure 8:
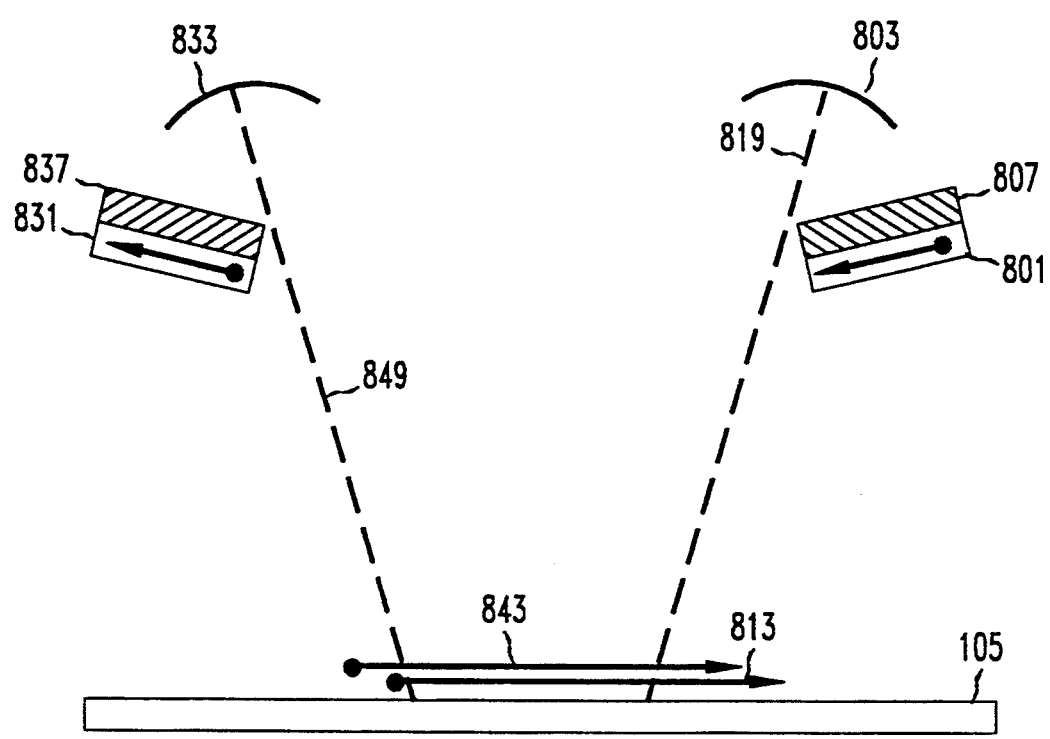
FIG. 8 is a top view of another embodiment of the invention in which an additional video image source and parabolic mirror are arranged so that the image from the additional video image source is also projected on the projection screen for use in projecting stereoscopic images.

FIG. 8 is a top view of another embodiment of the invention in which an additional video image source and parabolic mirror are arranged so that the image from the additional video image source is also projected on projection screen 105. Shown are 1) left video image source 801, 2) left concave mirror 803, 3) left polarizer 807, 4) right video image source 831, 5) right concave mirror 833, 6) right polarizer 837 and 7) projection screen 105. Left video image source 801 is the source resulting in the projection of left image 813, and right video image source 831 is the source resulting in the projection of right image 843.

Left video image source 801 and left concave mirror 803 are arranged substantially as described above in FIG. 3 except that they are now located to the left of the horizontal center of projection screen 105 and optic axis 819 of left concave minor 803 is additionally pointed in the general direction of the horizontal center of projection screen 105. Additionally, by appropriately adjusting the orientation of the plane of left video image source 801, so that its left side is closer to left concave mirror 803 than is its right side, left image 813 can be made to be in focus across the plane of projection screen 105 and to be free of distortion attributable to projection from the left of optic axis 819 of concave mirror 803. Similarly, right video image source 831 and right concave mirror 833 are also arranged substantially as described above in FIG. 3 except that they are located to the right of the horizontal center of projection screen 105 and optic axis 849 of right concave mirror 833 is additionally pointed in the general direction of the horizontal center of projection screen 105. Additionally, by appropriately adjusting the orientation of the plane of right video image source 831, so that its right side is closer to right concave mirror 833 than its left side, right image 843 can be made to be in focus across the plane of projection screen 105 and to be free of distortion attributable to projection from the right of optic axis 849 of right concave mirror 833.

Interposed between each of video image sources 801 and 831 and its respective parabolic mirror is one of polarizers 807 and 837. Polarizers 807 and 837 each polarize the light passing through it from its associated video image source in a direction substantially orthogonal to that of the other. If the images displayed on each of video image sources 801 and 831 are left and right full color stereoscopic images, and screen 105 is viewed while wearing a pair of glasses in which each lens only passes the polarized light for one of the projected images, the viewer will see a full color stereoscopic, i.e., 3-dimensional, image.

Figure 9:
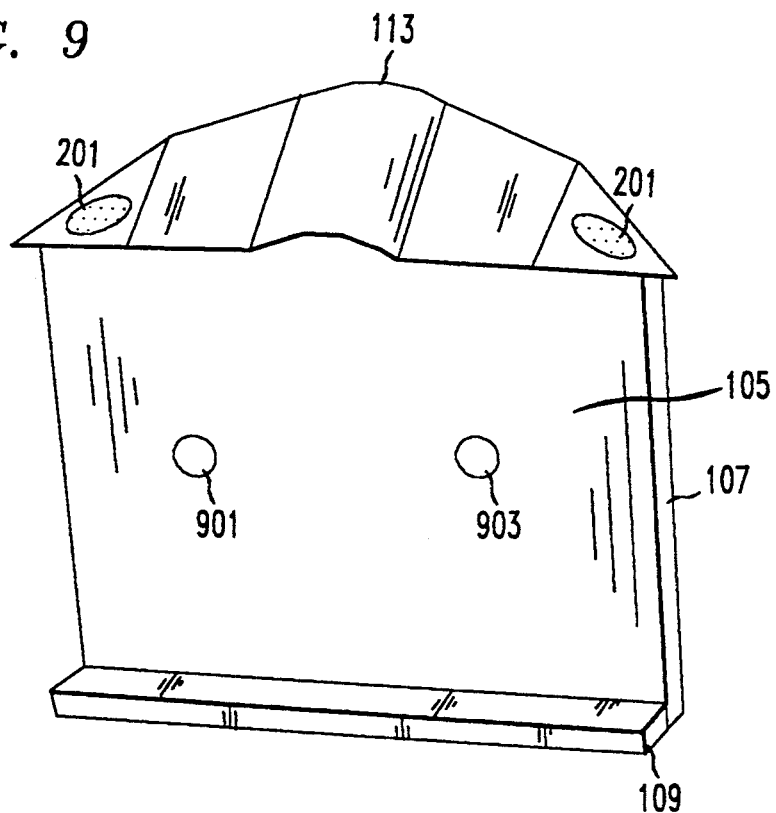
FIG. 9 shows the positioning of two video camera optics assemblies that are necessary for purposes of stereoscopic video telephony.

For purposes of generating two video images for stereoscopic video telephony, two video camera optics assemblies are required. Such video camera optics assemblies could be mounted in any manner described above. Each such video camera optics assembly would be arranged to receive separate views from the same horizontal plane but displaced from each other. FIG. 9 shows projection screen 105, supportive frame 107, base 109, shroud 113, and speakers 201 with two small spaced apart holes 901 and 903, located vertically along a horizontal line approximately in the center of projection screen 105 and symmetrically positioned away from the horizontal center of projection screen 105. Again, advantageously, the image resulting from such video camera optics assemblies placement can provide good eye contact to a remote party viewing the resulting stereoscopic image. It is noted that holes 901, 903 need not be in the vertical or horizontal center of projection screen 105, but may be placed to have the most advantageous field of view and/or human factors, depending on application of the projection system.

Figure 10:
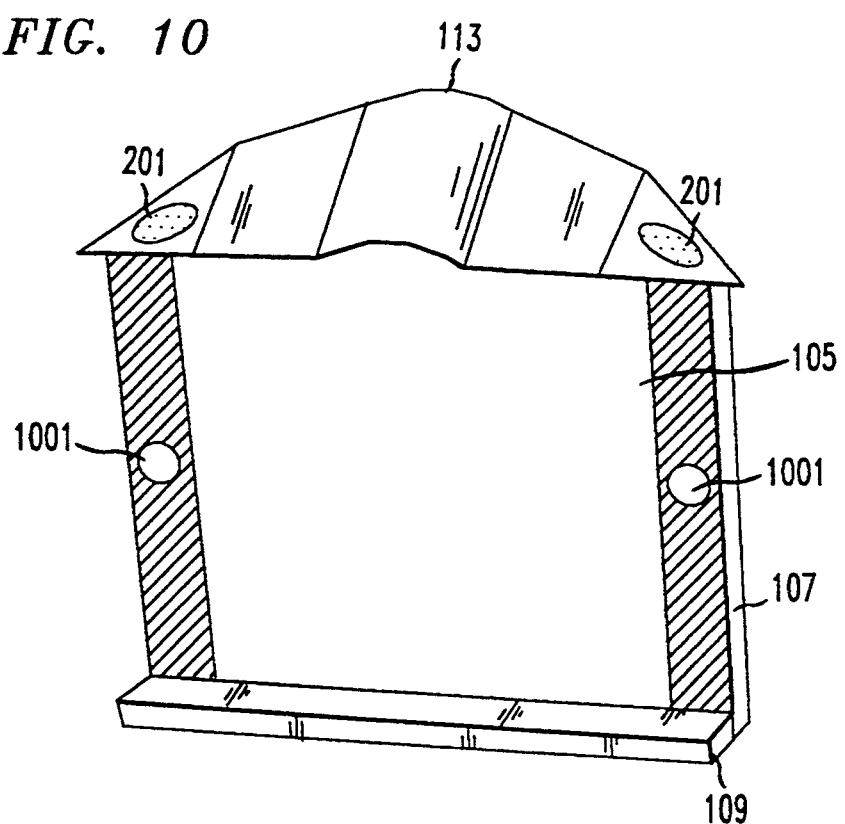
FIG. 10 shows another embodiment for positioning of the two video camera optics assemblies that are necessary for purposes of stereoscopic video telephony in which the video camera optics assemblies are mounted inside of the supports shown in FIG. 1.

Alternatively, such video camera optics assemblies may simply be mounted at or beyond each vertical edge of projection screen 105, e.g., attached to or inside supports 107. FIG. 10 shows such an embodiment in which video camera optics assemblies 1001 are mounted inside of supports 107.

It is noted that although the image is being projected from the top in the embodiments of the invention described herein, the invention also contemplates projection of the image from the bottom or sides of projection screen 105. In essence, the entire system of FIG. 1 would be rotated for use in the desired space, while maintaining the relative geometry positioning the components. Any suitable surface, such as a wall, a portion of a desk or even a cloth sheet, may be substituted for projection screen 105. Thus, embodiments of the invention may be made in which the entire projection system and any optional video cameras may be contained within a shroud, such as shroud 113, that may be hung on a wall. An optional extensible projection screen 105 may also be incorporated into the shroud. It is also noted that other sources of video images, e.g., a cathode ray tube or an LED display panel, could be used as video image source 101.

The foregoing merely illustrates the principles of the inventions. It will thus be appreciated that those skilled in the art will be able to devise various arrangements which, although not explicitly described or shown herein, embody the principles of the invention and are thus within its spirit and scope.

I claim:
1. A video projection system comprising:
   a video image source producing a video image;
   a concave mirror having an optic axis and a principal focal surface intersecting said optic axis at a focal point; and
   means for positioning said video image source at a position located off of said optic axis and within a volume defined by said principal focal surface and a corresponding surface intersecting said optic axis at a second point that is twice the distance from said concave mirror as is said focal point, so as to produce a real, inverted magnified image of said video image off of said optic axis.
2. The invention as defined in claim 1 wherein the plane of said video image source is maintained at a non-perpendicular angle to said optic axis of said concave mirror.
3. The invention as defined in claim 2 further including a projection green positioned so that a surface of said projection screen coincides with the surface in which said real, inverted magnified image is in focus.
4. The invention as defined in claim 1 wherein said concave mirror is a parabolic mirror so that said focal surface and said corresponding surface are both planes perpendicular to said optic axis.
5. The invention as defined in claim 1 wherein said video image source is a flat panel display unit.
6. The invention as defined in claim 1 further including a projection screen positioned so that a surface of said projection screen coincides with the surface of said real, inverted magnified image.
7. The invention as defined in claim 6 wherein said concave mirror is located on the same side of said projection screen as is said surface of said projection screen that coincides with the surface in which said real, inverted magnified image is in focus.
8. The invention as defined in claim 7 wherein said video image source is located on the same side of said projection screen as is said surface of said projection screen that coincides with the surface in which said real, inverted magnified image is in focus.
9. The invention as defined in claim 1 further including a video camera having image sensing means for capturing images of the environs of said video projection system.
10. The invention as defined in claim 9 further including a projection screen positioned so that a surface of said projection screen coincides with the surface of said real, inverted magnified image, said projection screen having a transparent area through which light passes to form an image on said image sensing means which is mounted behind the surface of said screen furthest from said concave mirror.
11. The invention as defined in claim 10 wherein said transparent area may controllably be made opaque.
12. The invention as defined in claim 10 wherein said transparent area is a hole.
13. A stereoscopic video projection system comprising:
   a plurality of video image sources each producing a video image;
   a plurality of concave mirrors, each having an optic axis and a principal focal surface intersecting said optic axis at a focal point, each of said concave mirrors being associated with a respective one of said video image sources;
   a plurality of polarizers, each of said polarizers polarizing light in a direction substantially orthogonal to the directions of polarization of all of said other polarizers of said plurality of polarizers and each of said polarizers being interposed between one of said plurality of video image sources and its associated concave mirror; and
   means for positioning each of said video image sources at a position off of said optic axis of its associated concave mirror and within a volume defined by said principal focal surface of said associated concave mirror and a surface corresponding to said principal focal surface of said associated concave mirror that intersects with said optic axis of said associated concave mirror at a point that is twice the distance from said associated concave mirror as is said focal point of said associated concave mirror to produce a plurality of real, inverted, magnified images, each of said real, inverted, magnified images being (i) of one of said video images, (ii) produced by the one of said plurality of con- cave mirrors associated with the one of said video image sources producing said one of said video images, and (iii) off of at least said optic axis of said producing one of said concave mirrors.

14. A stereoscopic video projection system comprising:
   a plurality of video image sources each producing a video image;
   a plurality of concave mirrors, each having an optic axis and a principal focal surface intersecting said optic axis at a focal point, each of said concave mirrors being associated with a respective one of said video image sources;
   a plurality of polarizers, each of said polarizers polarizing light in a direction substantially orthogonal to the directions of polarization of all of said other polarizers of said plurality of polarizers and each of said polarizers being interposed between one of said plurality of video image sources and its associated concave mirror; and
   means for positioning each of said video image sources at a position off of said optic axis of its associated concave mirror and within a volume defined by said principal focal surface of said associated concave mirror and a surface corresponding to said principal focal surface of said associated concave mirror that intersects with said optic axis of said associated concave mirror at a point that is twice the distance from said associated concave mirror as is said focal point of said associated concave mirror to produce a plurality of real, inverted, magnified images, each of said real, inverted, magnified images being (i) of one of said video images and (ii) off of at least one of said optic axes.

15. The invention as defined in claim 14 wherein each of said concave mirrors is a parabolic mirror so that said principal focal surface and said corresponding surface of each of said concave mirrors are both planes perpendicular to said optic axis of each of said concave mirrors.

16. The invention as defined in claim 14 further including at least one video camera image sensing means for capturing images of the environs of said stereoscopic video projection system.

17. The invention as defined in claim 14 wherein the plane of each of said video image sources is maintained at a non-perpendicular angle to said optic axis of its associated one of said concave mirrors so that each of said real, inverted, magnified images are all in focus in the same surface.

18. The invention as defined in claim 17 further including a projection screen positioned so that the surface of said projection screen coincides with said surface in which all of said real, inverted, magnified images are in focus.

19. The invention as defined in 17 further including a plurality of video camera image sensing means for capturing stereoscopic images of the environs of said stereoscopic video projection system.

20. The invention as defined in 19 further including a projection screen positioned so that the surface of said projection screen coincides with a surface in which all of said real, inverted, magnified images are in focus, said projection screen having a plurality of transparent areas each which permits light to pass through and reach at least one of said video camera image sensing means which are all being positioned on the side of said projection screen furthest from said plurality of concave mirrors.

21. The invention as defined in claim 20 wherein at least one of said transparent areas is a hole.

22. The invention as defined in claim 20 wherein at least one of said transparent areas may controllably be made opaque.

* * * * *

UNITED STATES PATENT AND TRADEMARK OFFICE
CERTIFICATE OF CORRECTION

PATENT NO. : 5,394,198
DATED : February 28, 1995
INVENTOR(S) : Richard H. Janow It is certified that error appears in the above-identified patent and that said Letters Patent is hereby corrected as shown below:

Column 3, line 43, "minor" should read --mirror--.

Column 7, line 68, "green" should read --screen--.

Signed and Sealed this

Eighteenth Day of July, 1995

*Attest:*

BRUCE LEHMAN

*Attesting Officer*    *Commissioner of Patents and Trademarks*